United States Patent [19]

Popa et al.

[11] Patent Number: 5,051,311

[45] Date of Patent: Sep. 24, 1991

[54] SILICONE CORROSION PROTECTION COATING HAVING EXTENDED BATH LIFE

[75] Inventors: Paul J. Popa, Bay County; Arthur J. Tselepis; Harold L. Vincent, both of Midland County, all of Mich.

[73] Assignee: Dow Corning Corporation, Midland, Mich.

[21] Appl. No.: 487,329

[22] Filed: Mar. 1, 1990

[51] Int. Cl.$^5$ ................................. B32B 9/04
[52] U.S. Cl. ..................... 428/447; 524/378; 524/398; 524/381; 524/382; 525/477; 525/478; 525/479
[58] Field of Search .............. 525/477, 478, 479; 524/378, 398, 381, 382; 428/447

[56] References Cited

U.S. PATENT DOCUMENTS

| 4,322,518 | 3/1982 | Blizzard | 528/15 |
| 4,537,829 | 8/1985 | Blizzard | 428/429 |
| 4,701,380 | 10/1987 | Narula et al. | 428/447 |
| 4,808,640 | 2/1989 | Morita et al. | 525/477 |
| 4,824,903 | 4/1989 | Aizawa et al. | 525/478 |
| 4,882,377 | 11/1989 | Sweet et al. | 525/477 |

Primary Examiner—Melvyn I. Marquis
Assistant Examiner—Margaret W. Glass
Attorney, Agent, or Firm—Alexander Weitz

[57] ABSTRACT

A curable coating composition, which provides excellent corrosion protection to metals, is disclosed. The composition comprises (I) a reaction product (or blend) of a resinous copolymeric siloxane solution with a liquid organohydrogenpolysiloxane, (II) a hydroxy-functional diorganopolysiloxane, (III) an organosilane, (IV) a trialkyl orthoformate, (V) an organic titanate and (VI) a condensation catalyst. High solids compositions of the present invention can be applied by conventional siphon cup spray equipment and have an extended bath life relative to prior art formulations of this type.

28 Claims, No Drawings

SILICONE CORROSION PROTECTION COATING HAVING EXTENDED BATH LIFE

The present invention relates to improved curable silicone coating compositions. More particularly, the present invention relates to such coating compositions which have an extended bath life and provide corrosion resistance to metal surfaces when cured thereon.

BACKGROUND OF THE INVENTION

In U.S. Pat. No. 4,322,518, assigned to the assignee of the present invention and hereby incorporated by reference, Blizzard discloses silicone coating compositions which comprise a solventless liquid copolymeric organopolysiloxane and a diorganopolysiloxane fluid or gum containing vinyl and/or hydroxyl radicals. When cured on various substrates, these silicone compositions provide release coatings having controllable release forces for adhesives adhered thereto.

Blizzard and Swihart, in U.S. Pat. No. 4,537,829, assigned to the assignee of the present invention, teach compositions similar to those described by Blizzard, cited supra, which further comprise an organosilicon resin consisting essentially of dimethylvinylsiloxy units, trimethylsiloxy units and $SiO_{4/2}$ units and a hydrosilylation catalyst. These compositions, when cured, provided improved resistance to fuels and a high degree of corrosion protection to metal substrates.

In U.S. Pat. No. 4,701,380, assigned to the assignee of the present invention and hereby incorporated by reference, Narula et al. show that compositions similar to those taught by Blizzard, based on a hydroxy-functional diorganopolysiloxane, can be cured at room temperature to provide a strongly adhering corrosion protective coating when modified with a minor amount of an adhesion promoter selected from a specific group of functional organosilanes. In order to be of commercial value, all of the above mentioned coating compositions are generally applied from an organic solvent solution and they require the further addition of a catalyst so that the time to cure the coating is not excessive.

Although the coating compositions disclosed by Narula et al., cited supra, do provide excellent corrosion protection to ferrous metals when cured thereon, these coating systems have been found to have some inherent drawbacks. Thus, this patent suggests application of the compositions to substrates by a spray method, this coating technique being well appreciated in the art for its relative speed and efficiency. And, even though airless sprayers can handle higher viscosity compositions, commercial applicators strongly prefer to have the added flexibility of using conventional siphon cup spray equipment, wherein viscosity must remain below about 1,000 cP. From a practical standpoint, this means that the above mentioned silicone coating compositions containing a diorganopolysiloxane gum must include a high proportion of organic solvents to have the desired low viscosity. Such a coating composition, further containing a cure catalyst, can be effectively sprayed by conventional equipment but this advantage is overshadowed by its high total volatile organic compounds (VOC) content. The skilled artisan will appreciate the current efforts to reduce total VOC in coating compositions of all types as there has been considerable legislation in the United States toward this end, particularly in the state of California. Furthermore, economic considerations, such as a reduction in coating composition volume and an increased film build per spray pass, provide a strong motivation to use high solids systems, the term "high solids" denoting herein a non-volatile content of 50 to about 100 weight percent or having a total VOC of $\leq 420$ grams/liter.

An alternative way to achieve the desired low viscosity in the compositions disclosed by Narula et al. is to employ a diorganopolysiloxane having a low molecular weight (i.e., a low viscosity fluid). While a catalyzed high solids coating composition of this type can be sprayed by conventional equipment soon after it is prepared, its viscosity soon climbs out of the preferred range. This short "bath life" (i.e., the maximum time, after being catalyzed, that a batch of the coating composition can be satisfactorily sprayed) severely restricts the batch size which may be used and therefore results in inefficiencies associated with mixing extra batches of the composition and cleaning spray equipment between batches. While not wishing to be bound by any particular theory or mechanism, it is believed that the reduced bath life of such compositions is in large part due to the inherently higher functionality (reactivity) of the low molecular weight diorganopolysiloxane fluids relative to the corresponding gums. It is further believed that the functionality of the diorganopolysiloxane fluid can also react with the functional organosilane adhesion promoter in the presence of moisture. Such a reaction could explain the observed formation of a "skin" at the surface of catalyzed coating compositions prepared according to the disclosure of Narula et al. Although surface skin which is primarily due to solvent evaporation can generally be re-dissolved by mixing it back into the coating composition, it has been found that this is not always possible in the case of sprayable high solids coating systems of Narula et al. When this skin can not be re-dispersed, it tends to clog filters and nozzles in the spray equipment and can result in poor surface quality of the coating. Again, not wishing to be bound by a particular theory, it is believed that the apparently gelled skin results from the interaction of the hydroxy-functional diorganopolysiloxane with the functional organosilane adhesion promoter in the presence of surface moisture.

SUMMARY OF THE INVENTION

It has now been found that silicone compositions prepared according to the disclosure of and Narula et al., cited supra, can be modified by the inclusion of a bath life extender to provide high solids systems which do not exhibit the above mentioned disadvantages and are sprayable in conventional siphon cup spray equipment. Moreover, these modified systems retain the advantages of the compositions of Narula et al. in that they also provide excellent corrosion protection to metals when cured on the surfaces thereof. Additionally, the adhesion of the coatings to a substrate is not compromised, regardless of whether they are cured at room temperature or at elevated temperatures. These advantages are realized when the above mentioned bath life extender is a combination of a trialkyl orthoformate and an organic titanate. That an organic titanate can actually increase the bath life of these compositions is quite surprising since these titanates are generally considered to act as condensation catalysts for such silicone systems. The present invention therefore relates to a curable composition comprising:

(I) from about 10 to about 90 parts by weight of a liquid organopolysiloxane copolymer, prepared by a method comprising (A) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{1/2}$ siloxane units and $SiO_{4/2}$ siloxane units wherein the ratio of said $R_3SiO_{1/2}$ units to said $SiO_{4/2}$ units has a value of 0.6:1 to 0.9:1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating said homogeneous mixture to remove substantially all of said organic solvent therefrom;

(II) from about 90 to about 10 parts by weight of a hydroxy-functional diorganopolysiloxane having the average formula $(HO)R'''_2SiO(R'''_2SiO)_cSiR'''_2(OH)$ wherein R''' is a group selected from alkyl, cycloalkyl, haloalkyl, aromatic or haloaromatic radicals and c has a value sufficient to provide a viscosity of about 1 to about 500 Poise at 25° C. for said diorganopolysiloxane;

(III) from about 1 to about 10 parts by weight, per 100 parts of said component (I) plus component (II), of at least one organosilane having the formula $QSi(OR'''')_3$ wherein the group Q is selected from vinyl, 3-glycidoxypropyl, 3-methacryloxypropyl or 3-(N-styrylmethyl-2-aminoethylamino)-propyl hydrochloride groups and R'''' is selected from alkyl groups having 1 to 4 carbon atoms, alkoxyalkyl groups having a total of up to 5 carbon atoms or an acetyl group;

(IV) from about 1 to about 10 parts by weight, per 100 parts of said component (I) plus component (II), of a trialkyl orthoformate in which the alkyl groups contain 1-3 carbon atoms;

(V) from about 4 to about 10 parts by weight, per 100 parts of said component (I) plus component (II), of an organic titanate selected from the group consisting of $Ti(OR'''')_4$ and $(AcAc)Ti(OR'''')_2$, in which R'''' is independently selected from alkyl radicals having 3 to 8 carbon atoms and AcAc denotes an acetylacetonate group; and (VI) a sufficient amount of a condensation catalyst to cure said composition.

This invention further relates to a similar composition to that described above, wherein said component (I) is prepared by simply mixing said components (a) and (b) without subsequent heating and removal of solvent therefrom.

DETAILED DESCRIPTION OF THE INVENTION

Component (I) of the compositions of this invention is a liquid copolymeric organopolysiloxane. It may be prepared by reacting (a) a resinous copolymeric siloxane with (b) a liquid organohydrogenpolysiloxane. Alternatively, component (I) may be prepared by simply blending reactants (a) and (b) and using this mixture directly in the compositions of the present invention.

Component (a) is an organic solvent solution of a resinous copolymeric siloxane consisting essentially of $R_3SiO_{1/2}$ units and $SiO_{4/2}$ units which contains from 0.6 to 0.9 $R_3SiO_{1/2}$ units for every $SiO_{4/2}$ unit. Each R denotes a monovalent hydrocarbon radical; such as an alkyl radical, such as methyl, ethyl, isopropyl, butyl and hexyl; an alkenyl radical, such as vinyl and allyl; an aryl radical, such as phenyl, tolyl and xylyl; an arylalkyl radical, such as beta-phenylethyl and beta-phenylpropyl; and a cycloaliphatic radical, such as cyclopentyl and cyclohexyl. Preferably all R radicals in component (a) are lower alkyl radicals, although a minor portion of them can be replaced with other monovalent hydrocarbon radicals such as vinyl radical and/or a phenyl radical, to provide additional properties for the resinous copolymer such as the reactivity attendant therewith.

In a preferred curable coating composition of this invention, the resinous copolymeric siloxane portion of component (a) consists essentially of $(CH_3)_3SiO_{1/2}$ siloxane units and $SiO_{4/2}$ siloxane units in the number ratio of about 0.75:1, respectively.

Component (b) that is used to prepare the liquid copolymeric organopolysiloxane (I) is any liquid organohydrogenpolysiloxane containing an average of at least one silicon-bonded hydrogen radical per molecule and can have a linear, cyclic or branched structure or combinations thereof. An organohydrogenpolysiloxane having the formula

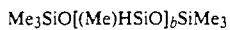

$Me_3SiO[(Me)HSiO]_bSiMe_3$ wherein Me hereinafter denotes a methyl radical and b has an average value of from 30 to 70 is a highly preferred component (b). It is particularly preferred that b is about 35.

Component (I) preferably consists essentially of a devolatilized reaction product of components (a) and (b). Alternately, it has been found that component (I) may also consist essentially of a blend of components (a) and (b) formed at room temperature wherein the solvent introduced by component (a) is retained when forming the curable silicone compositions of this invention. On a solids basis, the organohydrogenpolysiloxane (i.e., component b) content of component (I) varies between about 10 and 90 weight percent of the total blend or reaction product. Preferably, the organohydrogenpolysiloxane content of component (I) varies between about 40 and 60 weight percent on a solids basis. Herein, the term "solids basis" denotes the nonvolatile content of any composition or component.

Further details dealing with the preparation of component (I) by this method, as well as descriptions of components (a) and (b), may be found in U.S. Pat. No. 4,322,518 to Blizzard, cited supra.

When component (I) is a room temperature blend of components (a) and (b), its preparation simply consists of forming a homogeneous solution between these ingredients. As in the case of the reaction product, described above, an acid number greater than zero is required and an acid number between about 0.1 and 1, on a solids basis, is preferred.

Component (II) of this invention is a polydiorganosiloxane fluid having the general formula

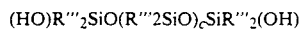

$(HO)R'''_2SiO(R'''_2SiO)_cSiR'''_2(OH)$ wherein R''' denotes a monovalent hydrocarbon radical selected from the group of R radicals indicated above for component (I). For the purpose of this invention, at least 95 percent of the R''' radicals are methyl (Me) and it is preferred that all R''' radicals are methyl. Herein, c has a value which is sufficient to provide a viscosity for component (II) of about 1 to 500 P (Poise) at 25° C. Preferably, the viscosity of component (II) is about 150

P at 25° C. Polydiorganosiloxanes which are suitable for use as component (II) are well known in the art and many of these fluids are available commercially. Therefore, further description of methods for the preparation of such materials is not detailed herein.

Component (III) of the present invention is an organosilane having the general formula $QSi(OR'''')_3$. The group Q is selected from $CH_2=CH-$,

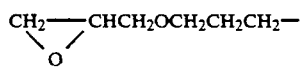

(i.e., 3-glycidoxypropyl), $CH_2=C(CH_3)C(O)OCH_2CH_2CH_2-$ (i.e., 3-methacryloxypropyl) or $HCl.CH_2=CH(C_6H_4)CH_2NHCH_2CH_2NH(CH_2)_3-$ (i.e., 3-(N-styrylmethyl-2-aminoethylamino)-propyl hydrochloride). In the above formula, $R''''$ may be an alkyl group having 1 to 4 carbon atoms, an alkoxyalkyl group having a total of up to 5 carbon atoms or an acetyl group. Combinations of different organosilanes are also contemplated for use as component (III) of this invention.

Specific examples of component (III) suitable for use in the present invention are 3-glycidoxypropyltrimethoxysilane, 3-(N-styrylmethyl-2-aminoethylamino)-propyltrimethoxysilane hydrochloride, 3-methacryloxypropyltrimethoxysilane, vinyltrimethoxysilane, vinyltriacetoxysilane and vinyltris(2-methoxyethoxy)silane.

It is preferred that the Q group of component (III) is selected from vinyl or 3-glycidoxypropyl and $R''''$ is selected from methyl or acetyl. Particularly preferred organosilanes are 3-glycidoxypropyltrimethoxysilane and mixtures of 3-glycidoxypropyltrimethoxysilane with vinyltriacetoxysilane, said mixtures being preferably heated for 1-4 hours at about 150° C. and containing approximately equal parts by weight of each silane.

The organosilanes of component (III) are well known in the art and many of them are commercially available, hence further description of methods of preparation will not be addressed herein.

In order to prepare the silicone coating compositions having an extended bath life according to the present invention, from 10 to 90 parts by weight of component (I) are thoroughly mixed with from 90 to 10 parts by weight of component (II), a weight ratio of (I) to (II) of about 45:55 being preferred. With each 100 parts by weight of this mixture of (I) and (II), there is thoroughly mixed from about 1 to about 10 parts by weight, of above described component (III); from about 1 to about 10 parts by weight of (IV) a trialkyl orthoformate; from about 4 to about 10 parts by weight of (V) an organic titanate; and a sufficient amount of (VI) a condensation catalyst to cure said composition. The above proportions are based on a 100% solids system, although various organic solvents which do not contain active hydrogen groups are preferably added to adjust the solids content, and therefore the viscosity and sprayability, of the resulting coating composition. Suitable solvents include methyl isobutyl ketone, methyl amyl ketone, various aliphatic solvents, isobutyl acetate, mineral spirits, various aromatic solvents, such as toluene and xylene, and 1,1,1-trichloroethane.

Component (IV) is selected from trialkyl orthoformates in which the alkyl groups contain 1-3 carbon atoms and is preferably triethyl orthoformate.

Component (V) is an organic titanate selected from the group consisting of $Ti(OR''''')_4$ and $(AcAc)-Ti(OR''''')_2$, in which $R'''''$ is independently selected from alkyl radicals having 3 to 8 carbon atoms and AcAc denotes an acetylacetonate group. Preferably, component (V) is tetra(n-butyl) titanate.

These two components (i.e., IV and V) are believed to interact in the compositions of the present invention so as to increase their bath life.

The condensation catalysts (i.e., component VI) suitable for use in this invention include any of the compounds which are known to facilitate the reactions between SiOH groups and between SiOH and SiH groups. For example, the catalysts contemplated may be salts of heavy metals, such as dibutyltin diacetate and stannous octoate, preferably dibutyltin diacetate. The amount of the catalyst needed to effectively cure a given composition will readily be determined by the skilled artisan through routine experimentation. Typically, this component is employed at a level of about 0.1 to about 5 parts by weight, on a solids basis, for each 100 parts by weight of said components (I) plus (II).

Although all of the above named components may be mixed just before application of the resulting coating composition to a substrate, it is preferred that they are separately packaged to provide a storage stable system. It is thus preferred that components (I) and (II) are mixed to form a first part (part A), components (III), (IV) and (VI) are mixed to form a second part (part B) and component (V) forms a third part (part C). These parts are stored separately until ready for use in a given coating operation, whereupon they are blended to form a homogeneous coating composition according to the present invention.

The compositions of this invention can further comprise typical silicone adjuvants such as catalysts, fillers, pigments, dyes, rheology control additives, solvents and cure-control additives, if desired. When solvents are used, it is preferred to add them to part B and/or part C.

The compositions of the present invention find particular utility as coatings for metal substrates, as described in the patent to Narula et al., cited supra. When applied as 100% solids or from solution and cured on such substrates as iron, steel, aluminum, brass or copper, coatings comprising these compositions provide excellent corrosion protection to the metal surfaces. This is particularly true for the case of ferrous metals exposed to moisture and salt. Moreover, the compositions of the present invention can be cured at room temperature and still form strongly adhering coatings on such substrates.

The coating compositions of this invention may be applied to metal surfaces by any of the methods commonly practiced in the coating arts. They find particular utility in conventional spray applications where the extended bath life of the systems typically allows a catalyzed batch to be processed during an entire eight hour work shift.

After coating of the metal substrates with the compositions of this invention, the coatings, which generally should be at least about 1.0 mil in thickness, are cured. This may be done at room temperature (i.e., about 25° C.) or may be carried out at an elevated temperature ranging from 50° to 250° C.

EXAMPLES

The following examples are presented to further illustrate the compositions of this invention, but are not to be construed as limiting the invention, which is delineated in the appended claims. All parts and percentages in the examples are on a weight basis unless indicated to the contrary.

The following materials were employed in the preparation of the illustrative compositions.

COPOLYMER 1—A liquid organopolysiloxane copolymer was prepared by the methods of U.S. Pat. No. 4,322,518, cited supra. A 70% xylene solution of a siloxane resin copolymer consisting essentially of $(CH_3)_3SiO_{1/2}$ units and $SiO_2$ units in a molar ratio of approximately 0.75:1, was mixed at a level of 68 parts with 32 parts of a liquid organohydrogenpolysiloxane having the average formula

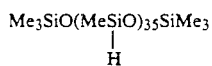

wherein Me hereinafter denotes a methyl radical. Using a nitrogen purge, xylene solvent was removed as this mixture was heated under a vacuum of about 100 mm Hg at 150° C. for 2 hours to yield a product containing a 60:40 weight ratio of the siloxane resin copolymer to the organohydrogenpolysiloxane.

COPOLYMER 2—A liquid organopolysiloxane copolymer similar to COPOLYMER 1 but having a 50:50 weight ratio of the siloxane resin copolymer to the organohydrogenpolysiloxane.

FLUID 1—A hydroxy-terminated polydimethylsiloxane having a viscosity of about 2,000 cP at 25° C.

FLUID 2—A hydroxy-terminated polydimethylsiloxane having a viscosity of about 15,000 cP at 25° C.

FLUID 3—A liquid organohydrogenpolysiloxane having the average formula

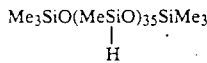

SILANE 1—A silane blend consisting of a 50:50 mixture of vinyltriacetoxysilane and 3-glycidoxypropyltrimethoxysilane which had been heated for four hours at about 145° C.

PIGMENT—A homogeneous dispersion of 35% titanium dioxide, 5% black iron oxide in 60% of said FLUID 2.

METHYL RESIN—A 70% xylene solution of a siloxane resin copolymer consisting essentially of $(CH_3)_3SiO_{1/2}$ units and $SiO_2$ units in a molar ratio of approximately 0.75:1. PROPYL RESIN—A silicone resin solution consisting essentially of 10% of a hydrolyzate of propyltrichlorosilane in toluene.

IBA—Isobutyl acetate.

MIBK—Methyl isobutyl ketone (4-Methyl-2-pentanone).

MAK—Methyl amyl ketone (2-Heptanone). Isopar G ®—Isoparaffinic solvent obtained from Exxon Co., Houston, Tex. Isopar L ®—Isoparaffinic solvent obtained from Exxon Co. Kwik-Dri ®—Aliphatic hydrocarbon solvent blend obtained from Ashland Chemical Co., Columbus, Ohio.

TEOF—Triethyl orthoformate (1,1,1'-[Methylidynetris(oxy)]tris[ethane]).

DBTDA—Dibutyltin diacetate catalyst (diacetoxydibutyltin). Bentone SD-2 ®—Organic derivative of a montmorillonite clay obtained from Rheox, Inc., Hightstown, N.J.

TBT—Tetra(n-butyl) titanate (Titanium [IV] butoxide).

EXAMPLES 1-4

The coating compositions shown in Table 1 were prepared according to the methods of U.S. Pat. No. 4,701,380, cited supra, wherein heptane solvent was used to adjust the total solids content of each formulation to 65%. In the comparative examples, the ingredients were mixed in the order presented. In Example 1, a blend of the first two ingredients (i.e., FLUID 2 and COPOLYMER 1) was mixed with a blend of the remaining ingredients.

TABLE 1

| Component | Example 1 | (Comparative) Example 2 | (Comparative) Example 3 | (Comparative) Example 4 |
|---|---|---|---|---|
| FLUID 2 | 65 | 65 | 65 | 65 |
| COPOLYMER 1 | 53.2 | 53.2 | 53.2 | 53.2 |
| Heptane | 69.2 | 70 | 66 | 73.2 |
| TEOF | 4 | — | 4 | — |
| SILANE 1 | 5.9 | 5.9 | 5.9 | 5.9 |
| DBTDA | 5.9 | 5.9 | 5.9 | 5.9 |
| TBT | 5.9 | — | — | 5.9 |

The viscosity of each catalyzed material was monitored as a function of time with a Brookfield LVF viscometer using a #3 spindle at 60 r.p.m. at a temperature of 75° F. In addition, the compositions were evaluated for sprayability using a Binks Model 62 siphon fed spray gun equipped with a #66 nozzle at an air pressure of 55 p.s.i. These results are presented in Tables 2 to 5 for the compositions of Examples 1 to 4, respectively.

TABLE 2

| Viscosity Data for Example 1 | | |
|---|---|---|
| Time (hours) | Viscosity (cP) | Comments |
| Initial | 800 | |
| 1 | 560 | Some skin on sides of beaker |
| 2 | 580 | |
| 3 | 700 | Light skin - removed |
| 4 | 850 | |
| 5 | 1000 | Some skin on sides of beaker/ Still sprayable |

TABLE 3

| Viscosity Data for (Comparative) Example 2 | | |
|---|---|---|
| Time (hours) | Viscosity (cP) | Comments |
| Initial | 160 | |
| 1 | 450 | Severe skin over |
| 2 | 980 | Severe skin over |
| 2.5 | 2940 | Severe skin over/ Too thick to spray |

TABLE 4

| Viscosity Data for (Comparative) Example 3 | | |
|---|---|---|
| Time (hours) | Viscosity (cP) | Comments |
| Initial | 140 | |
| 1 | 280 | Some skin on sides of beaker; mixed in skin |

TABLE 4-continued

Viscosity Data for (Comparative) Example 3

| Time (hours) | Viscosity (cP) | Comments |
|---|---|---|
| 2 | 500 | Some skin on sides of beaker; mixed in skin |
| 3 | 940 | |
| 4 | 1380 | Stopped - too thick to spray |

TABLE 5

Viscosity Data for (Comparative) Example 4

| Time (hours) | Viscosity (cP) | Comments |
|---|---|---|
| Initial | 240 | |
| 1 | 280 | Skin @30 & 60 min - removed skin |
| 2 | 360 | Skin @120 min - removed skin |
| 3 | 400 | |
| 4 | 620 | Skin @240 min - removed skin |
| 5 | 1140 | Skin @300 min - removed skin Stopped - too thick to spray |

EXAMPLES 5-8

The following formulated paints were prepared by thoroughly mixing pre-blended parts A and B, shown in Table 6, wherein the values indicate the percentage of each ingredient. In each case, the total solid content of the paint was adjusted to about 61% using Isopar G ® and Kwik-Dri ®.

TABLE 6

| | Example 5 | (Comparative) Example 6 | (Comparative) Example 7 | (Comparative) Example 8 |
|---|---|---|---|---|
| Part A | | | | |
| FLUID 2 | 23.83 | 23.83 | 23.83 | 23.83 |
| COPOLYMER 1 | 23.98 | 23.98 | 23.98 | 23.98 |
| PIGMENT | 9.15 | 9.15 | 9.15 | 9.15 |
| PROPYL RESIN | 0.30 | 0.30 | 0.30 | 0.30 |
| Part B | | | | |
| Isobutyl acetate | 1.6 | 1.6 | 1.6 | 1.6 |
| Methyl amyl ketone | 2.1 | 2.1 | 2.1 | 2.1 |
| Bentone SD-2 ® | 0.5 | 0.5 | 0.5 | 0.5 |
| Isopar L ® | 2.3 | 2.3 | 2.3 | 2.3 |
| Isopar G ® | 13.84 | 15.17 | 15.17 | 14.29 |
| Kwik-Dri ® | 13.85 | 15.17 | 15.17 | 14.29 |
| Triethyl orthoformate | 1.95 | 1.95 | — | — |
| SILANE 1 | 2.65 | 2.65 | 2.65 | 2.65 |
| DBTDA | 1.3 | 1.3 | 1.3 | 1.3 |
| TBT | 2.65 | | | 2.65 |
| | 100.00% | 100.00% | 100.00% | 100.00% |

These catalyzed paints were tested with respect to viscosity increase (at 100° F. in this series) and sprayability, as described above. The results are presented in Tables 7 to 10 for the compositions of Examples 5 to 8, respectively.

TABLE 7

Viscosity Data for Example 5

| Time (hours) | Viscosity (cP) | Comments |
|---|---|---|
| Initial | 340 | |
| 1 | 385 | No skin observed |
| 2 | 540 | No skin observed |
| 3 | 550 | No skin observed |
| 4 | 600 | No skin observed |
| 5 | 700 | No skin observed |
| 6 | 760 | No skin observed |
| 7 | 790 | No skin observed |
| 8 | 860 | No skin observed |

TABLE 8

Viscosity Data for (Comparative) Example 6

| Time (hours) | Viscosity (cP) | Comments |
|---|---|---|
| Initial | 340 | |
| 1 | 600 | Skinning @30 & 60 min - removed |
| 2 | 1380 | Skinning @90 & 120 min - removed; No longer sprayable |
| 3 | Gelled | |

TABLE 9

Viscosity Data for (Comparative) Example 7

| Time (hours) | Viscosity (cP) | Comments |
|---|---|---|
| Initial | 310 | |
| 1 | 620 | Skinning @15 & 60 min - removed |
| 2 | 920 | Skinning @90 & 120 min - removed |
| 2.5 | 1040 | Skinning @150 & 180 min - removed |
| 3 | 1520 | Skinning @210 & 240 min - removed No longer sprayable |

TABLE 10

Viscosity Data for (Comparative) Example 8

| Time (hours) | Viscosity (cP) | Comments |
|---|---|---|
| Initial | 590 | |
| 1 | 660 | Skinning @20 & 60 min - removed |
| 2 | 730 | Skinning @90 & 120 min - removed |
| 3 | 900 | Skinning @150 & 180 min - removed |
| 4 | 1080 | Skinning @210 & 240 min - removed Still Sprayable |
| 5 | 1360 | Skinning @270 & 300 min - removed; No longer sprayable |

EXAMPLES 9-10

The following examples were prepared as above by mixing the pre-blended parts A and B shown in Table 11 and illustrate the use of a lower molecular weight polydimethylsiloxane (i.e., FLUID 1). Again, the total solids content of these compositions was adjusted to about 61% by varying the Isopar G ® and Kwik-Dri ® contents.

TABLE 11

| | (Comparative) Example 9 | Example 10 |
|---|---|---|
| Part A | | |
| FLUID 1 | 24.5 | 24.5 |
| COPOLYMER 1 | 23.7 | 23.7 |

TABLE 11-continued

|  | (Comparative) Example 9 | Example 10 |
|---|---|---|
| PIGMENT | 8.4 | 8.4 |
| PROPYL RESIN | 0.2 | 0.2 |
| Part B |  |  |
| Isobutyl acetate | 1.6 | 1.6 |
| MIBK | 4.5 | 4.5 |
| Bentone SD-2 ® | 0.5 | 0.5 |
| Isopar G ® | 16.35 | 14.05 |
| Kwik-Dri ® | 16.35 | 14.05 |
| SILANE 1 | 2.6 | 2.6 |
| DBTDA | 1.3 | 1.3 |
| TEOF | — | 2.0 |
| TBT | — | 2.6 |
|  | 100.00 | 100.00 |

These catalyzed paints were tested with respect to viscosity increase (at 76° F. in this series) and sprayability, as described above. The results are presented in Tables 12 and 13 for the compositions of Examples 9 and 10, respectively.

TABLE 12

Viscosity Data for (Comparative) Example 9

| Time (hours) | Viscosity (cP) | Comments |
|---|---|---|
| Initial | 80 |  |
| 1 | 260 | Skinning @15 & 60 min - removed |
| 2 | 390 | Skinning @90 & 120 min - removed |
| 4 | 2800 | Skinning @150 & 240 min - removed; No longer sprayable |

TABLE 13

Viscosity Data for Example 10

| Time (hours) | Viscosity (cP) | Comments |
|---|---|---|
| Initial | 300 |  |
| 1 | 300 |  |
| 2 | 310 |  |
| 3 | 320 |  |
| 4 | 350 | Some skinning on sides--mixed in |
| 5 | 370 |  |
| 6 | 400 |  |
| 8 | 440 | Still able to spray |

EXAMPLES 11-12

Extremely high solids compositions were prepared according to the above methods wherein pre-blended parts A and B were mixed and heptane solvent was used to adjust the total solids content of each formulation to 95%. Table 14 shows the parts by weight of the various ingredients used.

TABLE 14

|  | (Comparative) Example 11 | Example 12 |
|---|---|---|
| Part A |  |  |
| FLUID 1 | 118.0 | 118.0 |
| COPOLYMER 1 | 98.8 | 98.8 |
| Part B |  |  |
| SILANE 1 | 10.4 | 10.4 |
| DBTDA | 5.2 | 5.2 |
| Heptane | 7.5 | — |
| TEOF | — | 8.0 |
| TBT | — | 10.4 |

These catalyzed coating compositions were tested with respect to viscosity increase (at 76° F. in this series) and sprayability, as described above. The results are presented in Tables 15 and 16 for the compositions of Examples 11 and 12, respectively. Because of the high viscosities, some air was "trapped" in the compositions during mixing.

TABLE 15

Viscosity Data for (Comparative) Example 11

| Time (hours) | Viscosity (cP) | Comments |
|---|---|---|
| Initial | 1140 |  |
| 1 | 1900 | Skinning @20 & 60 min - removed |
| 2 | 4100 | Skinning @120 min - removed |
| 3 | 5950 | Skinning @180 min - removed |
| 4 | 9000 | Skinning @240 min - removed |
| 4.5 | Gelled |  |

TABLE 16

Viscosity Data for Example 12

| Time (hours) | Viscosity (cP) | Comments |
|---|---|---|
| Initial | 5600 |  |
| 1 | 3400 | Some skinning on sides - trapped air |
| 2 | 3200 | Trapped air |
| 3 | 3300 | Trapped air |
| 4 | 3400 | Skinned over - removed - trapped air |
| 5 | 3600 | Trapped air |
| 7 | 4400 | Skinned over - removed - trapped air |

EXAMPLES 13-14

Very high solids paints were formulated according to the above methods wherein pre-blended parts A and B were mixed and heptane and isobutyl acetate solvents were used to adjust the total solids content of each formulation to 96%. Table 17 shows the parts by weight of the various ingredients used.

TABLE 17

|  | (Comparative) Example 13 | Example 14 |
|---|---|---|
| Part A |  |  |
| FLUID 1 | 98.0 | 98.0 |
| COPOLYMER 1 | 98.8 | 98.8 |
| PIGMENT | 33.6 | 33.6 |
| Bentone SD-2 ® | 2.0 | 2.0 |
| Isobutyl acetate | 7.5 | — |
| Part B |  |  |
| SILANE 1 | 10.4 | 10.4 |
| DBTDA | 5.2 | 5.2 |
| Heptane | 7.5 | — |
| TEOF | — | 8.0 |
| TBT | — | 10.4 |

These catalyzed paints were tested with respect to viscosity increase (at 76° F. in this series), as described above. The results are presented in Tables 18 and 19 for the compositions of Examples 13 and 14, respectively.

TABLE 18

Viscosity Data for (Comparative) Example 13

| Time (hours) | Viscosity (cP) | Comments |
|---|---|---|
| Initial | 12500 |  |
| 1 | 19000 | Skinning @20 & 60 min - removed |
| 1.5 | Gelled |  |

TABLE 19

Viscosity Data for Example 14

| Time (hours) | Viscosity (cP) | Comments |
|---|---|---|
| Initial | 9000 |  |
| 1 | 5000 | Some skinning on sides - removed |
| 2 | 6000 | Some skinning on sides - removed |
| 3 | 6000 | Some skinning on sides - removed |
| 4 | 6000 | Some skinning on sides - removed |

TABLE 19-continued

Viscosity Data for Example 14

| Time (hours) | Viscosity (cP) | Comments |
|---|---|---|
| 5 | 6750 | Some skinning on sides - removed |
| 6 | 6750 | Some skinning on sides - removed |

It was noted that, even after 6 hours, the catalyzed paint of Example 14 had a viscosity which could still be sprayed in airless spray equipment or could be diluted with solvents to be sprayed with conventional equipment. This is a striking contrast to (Comparative) Example 13, which gelled after only 1.5 hours.

EXAMPLES 15-17

The following formulated paints were prepared by thoroughly mixing pre-blended parts A and B and then mixing in part C. These formulations are shown in Table 20, wherein the values indicate the percentage of each ingredient.

TABLE 20

|  | Example 15 | Example 16 | Example 17 |
|---|---|---|---|
| Part A | | | |
| FLUID 2 | 24.474 | 24.474 | 24.474 |
| COPOLYMER 1 | 23.696 | — | — |
| COPOLYMER 2 | — | 19.192 | — |
| FLUID 3 | — | — | 9.478 |
| PIGMENT | 8.446 | 8.446 | 8.446 |
| Paint Additive #3 | 0.171 | 0.171 | 0.171 |
| Part B | | | |
| Isobutyl acetate | 1.578 | 1.578 | 1.578 |
| MIBK | 4.458 | 4.458 | 4.458 |
| Bentone SD-2 ® | 0.526 | 0.526 | 0.526 |
| METHYL RESIN | — | 6.514 | 19.747 |
| SILANE 1 | 2.632 | 2.632 | 2.632 |
| Isopar G ® | 14.053 | 13.048 | 11.289 |
| Kwik-Dri ® | 14.053 | 13.048 | 11.288 |
| TEOF | 1.965 | 1.965 | 1.965 |
| DBTDA | 1.316 | 1.316 | 1.316 |
| Part C | | | |
| TBT | 2.632 | 2.632 | 2.632 |
| Total | 100.000% | 100.000% | 100.000% |

These catalyzed paints were tested with respect to viscosity increase (at 75° F. in this series), as described above. The results are presented in Tables 21 to 23 for the compositions of Examples 15 to 17, respectively.

TABLE 21

Viscosity Data for Example 15

| Time (hours) | Viscosity (cP) | Comments |
|---|---|---|
| Initial | 990 | |
| 1 | 820 | Light skin; mixed in |
| 2 | 880 | |
| 3 | 770 | |
| 4 | 690 | Light skin; mixed in |
| 5 | 690 | |
| 6 | 740 | |
| 7 | 740 | Light skin; mixed in |
| 8 | 810 | |

TABLE 22

Viscosity Data for Example 16

| Time (hours) | Viscosity (cP) | Comments |
|---|---|---|
| Initial | 460 | |
| 1 | 330 | |
| 2 | 400 | |
| 3 | 510 | Light skin; mixed in |
| 4 | 610 | |
| 5 | 600 | |
| 6 | 640 | Light skin; mixed in |
| 7 | 690 | Light skin; mixed in |
| 8 | 720 | |

TABLE 23

Viscosity Data for Example 17

| Time (hours) | Viscosity (cP) | Comments |
|---|---|---|
| Initial | 350 | |
| 1 | 250 | |
| 2 | 290 | |
| 3 | 290 | |
| 4 | 320 | |
| 5 | 380 | |
| 6 | 380 | |
| 7 | 410 | |
| 8 | 420 | |

When these paint formulations were applied to substrates and dried at room temperature, they cured to tack free coatings in less than about 30 minutes.

We claim:

1. A curable composition comprising:
   (I) from about 10 to about 90 parts by weight of a liquid organopolysiloxane copolymer, prepared by a method comprising (A) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{1/2}$ siloxane units and $SiO_{4/2}$ siloxane units wherein the ratio of said $R_3SiO_{1/2}$ units to said $SiO_{4/2}$ units has a value of 0.6:1 to 0.9:1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating said homogeneous mixture to remove substantially all of said organic solvent therefrom;
   (II) from about 90 to about 10 parts by weight of a hydroxy-functional diorganopolysiloxane having the average formula $(HO)R'''_2SiO(R'''_2SiO)_cSiR'''_2(OH)$ wherein R''' is a group selected from alkyl, cycloalkyl, haloalkyl, aromatic or haloaromatic radicals and c has a value sufficient to provide a viscosity of about 1 to about 500 Poise at 25° C. for said diorganopolysiloxane;
   (III) from about 1 to about 10 parts by weight, per 100 parts of said component (I) plus component (II), of at least one organosilane having the formula $QSi(OR'''')_3$ wherein the group Q is selected from vinyl, 3-glycidoxypropyl, 3-methacryloxypropyl or 3-(N-styrylmethyl-2-aminoethylamino)-propyl hydrochloride groups and R'''' is selected from alkyl groups having 1 to 4 carbon atoms, alkoxyalkyl groups having a total of up to 5 carbon atoms or an acetyl group;
   (IV) from about 1 to about 10 parts by weight, per 100 parts of said component (I) plus component (II), of a trialkyl orthoformate in which the alkyl groups contain 1-3 carbon atoms;
   (V) from about 4 to about 10 parts by weight, per 100 parts of said component (I) plus component (II), of an organic titanate selected from the group consisting of Ti(OR''''')$_4$ and (AcAc)Ti(OR''''')$_2$, in which R''''' is an alkyl radical having 3 to 8 carbon atoms and AcAc denotes an acetylacetonate group; and (VI) a sufficient amount of a condensation catalyst to cure said composition.

2. The composition of claim 1, wherein R and R''' are methyl and said liquid organopolysiloxane copolymer is prepared from a homogeneous mixture having an acid number between 0.1 and 1, on a solids basis.

3. The composition of claim 2, wherein the ratio of R$_3$SiO$_{1/2}$ units to SiO$_{4/2}$ units has a value of about 0.75.

4. The composition of claim 3, wherein said liquid organohydrogenpolysiloxane is represented by the formula

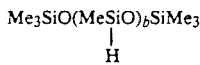

in which Me denotes a methyl radical and b has an average value of 30 to 70.

5. The composition of claim 4, wherein said component (IV) is triethyl orthoformate.

6. The composition of claim 5, wherein said component (V) is tetra(n-butyl) titanate.

7. The composition of claim 6, wherein said component (III) is at least one organosilane selected from the group consisting of 3-glycidoxypropyltrimethoxysilane and vinyltriacetoxysilane.

8. The composition of claim 7, wherein said liquid organohydrogenpolysiloxane (b) constitutes from about 40 to 60 weight percent of component (I) and said diorganopolysiloxane (II) has a viscosity of about 150 Poise at 25° C.

9. The composition of claim 8, wherein said condensation catalyst (VI) is dibutyltin diacetate.

10. The composition of claim 1, packaged as a three part system, such that said components (I) and (II) comprise a first part, said components (III), (IV) and ((VI) comprise a second part and said component (V) comprises a third part.

11. The composition of claim 9, packaged as a three part system, such that said components (I) and (II) comprise a first part, said components (III), (IV) and ((VI) comprise a second part and said component (V) comprises a third part.

12. A curable composition comprising:

(I) from about 10 to about 90 parts by weight of a blend, on a solids basis, of (a) an organic solvent solution of a resinous copolymeric siloxane containing silicon-bonded hydroxyl radicals and consisting essentially of R$_3$SiO$_{1/2}$ siloxane units and SiO$_{4/2}$ siloxane units wherein the ratio of said R$_3$SiO$_{1/2}$ units to said SiO$_{4/2}$ units has a value of 0.6:1 to 0.9:1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane;

(II) from about 90 to about 10 parts by weight of a hydroxy-functional diorganopolysiloxane having the average formula (HO)R'''$_2$SiO(R'''$_2$SiO)$_c$SiR'''$_2$(OH) wherein R''' is a group selected from alkyl, cycloalkyl, haloalkyl, aromatic or haloaromatic radicals and c has a value sufficient to provide a viscosity of about 1 to about 500 Poise at 25° C. for said diorganopolysiloxane;

(III) from about 1 to 10 parts by weight, per 100 parts of said component (I) plus component (II), of at least one organosilane having the formula QSi(OR'''')$_3$ wherein the group Q is selected from vinyl, 3-glycidoxypropyl, 3-methacryloxypropyl or 3-(N-styrylmethyl-2-aminoethylamino)-propyl hydrochloride groups and R'''' is selected from alkyl groups having 1 to 4 carbon atoms, alkoxyalkyl groups having a total of up to 5 carbon atoms or an acetyl group;

(IV) from about 1 to about 10 parts by weight, per 100 parts of said component (I) plus component (II), of a trialkyl orthoformate in which the alkyl groups contain 1-3 carbon atoms;

(V) from about 4 to about 10 parts by weight, per 100 parts of said component (I) plus component (II), of an organic titanate selected from the group consisting of Ti(OR''''')$_4$ and (AcAc)Ti(OR''''')$_2$, in which R''''' is an alkyl radical having 3 to 8 carbon atoms and AcAc denotes an acetylacetonate group; and (VI) a sufficient amount of a condensation catalyst to cure said composition.

13. The composition of claim 12, wherein R and R''' are methyl and said blend (I) is prepared from a homogeneous mixture having an acid number between 0.1 and 1, on a solids basis.

14. The composition of claim 13, wherein the ratio of R$_3$SiO$_{1/2}$ units to SiO$_{4/2}$ units has a value of about 0.75.

15. The composition of claim 14, wherein said liquid organohydrogenpolysiloxane is represented by the formula

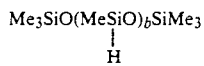

in which Me denotes a methyl radical and b has an average value of 30 to 70.

16. The composition of claim 15, wherein said component (IV) is triethyl orthoformate.

17. The composition of claim 16, wherein said component (V) is tetra (n-butyl) titanate.

18. The composition of claim 17, wherein said component (III) is at least one organosilane selected from the group consisting of 3-glycidoxypropyltrimethoxysilane and vinyltriacetoxysilane.

19. The composition of claim 18, wherein said liquid organohydrogenpolysiloxane (b) constitutes from about 40 to 60 weight percent of component (I) on a solids basis and said diorganopolysiloxane (II) has a viscosity of about 150 Poise at 25° C.

20. The composition of claim 19, wherein said condensation catalyst (VI) is dibutyltin diacetate.

21. The composition of claim 12, packaged as a three part system, such that said components (I) and (II) comprise a first part, said components (III), (IV) and ((VI) comprise a second part and said component (V) comprises a third part.

22. The composition of claim 20, packaged as a three part system, such that said components (I) and (II) comprise a first part, said components (III), (IV) and ((VI) comprise a second part and said component (V) comprises a third part.

23. A metal substrate coated with the cured composition of claim 1.

24. A metal substrate coated with the cured composition of claim 4.

25. A metal substrate coated with the cured composition of claim 8.

26. A metal substrate coated with the cured composition of claim 12.

27. A metal substrate coated with the cured composition of claim 15.

28. A metal substrate coated with the cured composition of claim 19.

* * * * *